US008505292B2

(12) United States Patent
Tsutsui et al.

(10) Patent No.: US 8,505,292 B2
(45) Date of Patent: Aug. 13, 2013

(54) BRAKING CONTROL APPARATUS FOR SLEWING TYPE WORKING MACHINE (75) Inventors: Akira Tsutsui, Kobe (JP); Hiroaki Kawai, Kobe (JP); Takahiro Kobayashi, Akashi (JP); Koichi Shimomura, Akashi (JP)

(73) Assignees: Kobe Steel, Ltd., Kobe-shi (JP); Kobelco Cranes Co., Ltd., Tokyo (JP)

( * ) Notice: Subject to any disclaimer, the term of this patent is extended or adjusted under 35 U.S.C. 154(b) by 773 days.

(21) Appl. No.: 12/756,474

(22) Filed: Apr. 8, 2010

(65) Prior Publication Data
US 2010/0263364 A1 Oct. 21, 2010

(30) Foreign Application Priority Data

Apr. 17, 2009 (JP) ................. 2009-100507

(51) Int. Cl.
 F15B 11/08 (2006.01)
 B66C 13/12 (2006.01)
(52) U.S. Cl.
 USPC ........................................... 60/466
(58) Field of Classification Search
 USPC ................................. 60/466, 468
 See application file for complete search history.

(56) References Cited

U.S. PATENT DOCUMENTS 5,062,266 A * 11/1991 Yoshimatsu ............ 60/466
5,063,742 A * 11/1991 Yoshimatsu ............ 60/466
5,160,056 A   11/1992 Yoshimatsu et al.
5,636,516 A *  6/1997 Kon ....................... 60/466

FOREIGN PATENT DOCUMENTS

| DE | 10 2006 040 459 A1 | 3/2007 |
| DE | 102006040459 A1 * | 3/2007 |
| JP | 60-85359 | 6/1985 |
| JP | 2-229329 | 9/1990 |
| JP | 3-177299 | 8/1991 |
| JP | 5-254784 | 10/1993 |
| JP | 06-024688 | 2/1994 |
| JP | 06-298492 | 10/1994 |
| JP | 2001-72381 | 3/2001 |
| JP | 2006-90080 | 4/2006 |

OTHER PUBLICATIONS

Notice of Reasons for Rejection mailed May 28, 2013 in Japanese Patent Application No. 2009-100507 filed Apr. 17, 2009 (with English Translation).

* cited by examiner

*Primary Examiner* — Thomas E Lazo
(74) *Attorney, Agent, or Firm* — Oblon, Spivak, McClelland, Maier & Neustadt, L.L.P.

(57) ABSTRACT

Provided is a braking control apparatus for a slewing type working machine capable of giving a braking operation easily intuitively grasped. This apparatus includes: a flow control valve actuator increasing an opening of a flow control valve between a slewing hydraulic motor and a hydraulic pump according to an operation amount of a slewing operation member; pressure control valves limiting respective maximums of an inlet and outlet pressures of the hydraulic motor to a set value corresponding to a pressure command signal to be input; a motor-side pressure controller which retains a set pressure of the motor inlet sided pressure control valve to a pressure for motor driving and lets a set pressure of the motor outlet side pressure control valve be a set pressure for a braking torque corresponding to an operation amount of a braking operation member other than the slewing operation member; and a valve opening limiter reducing the opening of the flow control valve in correspondence with the operation of the braking operation member.

6 Claims, 9 Drawing Sheets

BRAKING CONTROL APPARATUS FOR SLEWING TYPE WORKING MACHINE

BACKGROUND OF THE INVENTION

1. Field of the Invention

The present invention relates to a braking control apparatus for hydraulically braking a slewing structure in a slewing type working machine such as a crane.

2. Description of the Related Art

There has been conventionally known an apparatus for braking a slewing motion of a slewing structure in a working machine such as a crane, as described in, for example, Japanese Unexamined Patent Application Publication No. 2001-72381. This apparatus comprises a hydraulic motor for driving to slew, a hydraulic pump for supply to the hydraulic motor, a pilot controlled control valve positioned between the hydraulic motor and the hydraulic pump, a remote control valve for generating a pilot pressure according to an operation of a control lever, and a pair of brake valves for braking the slewing.

The control valve has a neutral position for intercepting a supply line connected to two ports of the hydraulic motor (for shutting off the hydraulic motor from the hydraulic pump) and pilot ports for receiving a pilot pressure, which produces an opening action of the control valve in a stroke corresponding to the pilot pressure. As the opening of the control valve is thus increased, the hydraulic oil discharged from the hydraulic pump is led to the hydraulic motor in a direction and a flow rate corresponding to the stroke, rotating the motor.

Each of the brake valves, which is formed of a pilot controlled valuable relief valve, is positioned between the supply line and a tank. The brake valve is opened by the sudden return of the control lever from its operation position to its neutral position, thereby preventing the hydraulic motor and the slewing structure from being given a strong shock.

This apparatus, however, involves a difficult braking operation which can be made only by high-skilled operators. Specifically, the apparatus requires a sensitive return operation of the control lever for controlling a degree of slewing braking: the relation between the operation of the control lever and the actual braking action cannot be grasped without rich experience.

On the other hand, there is known also an apparatus having a mechanical brake operated in synchronization with a depressing operation of a brake pedal, for performing a braking action without the above operation on the control lever (for example, as described in Japanese Unexamined Patent Application Publication No. 2006-90080); however, the mechanical brake includes a brake band and the like which wears so seriously as to have to be replaced in a short maintenance period. Moreover, the performance of the mechanical brake is tend to be degraded due to a penetration of earth and sand or water, requiring a special structure for protecting itself.

SUMMARY OF THE INVENTION

It is an object of the present invention to provide a braking control apparatus, for a working machine, giving an easy operation capable of being intuitively grasped without use of a mechanical brake.

The apparatus is provided in a working machine having a slewing structure, a hydraulic motor, and a hydraulic pump for supply a hydraulic fluid to the hydraulic motor, comprising: a slewing motion detector which detects information about a slewing angular velocity of the slewing structure; a slewing operation member which is operated to specify a rotation direction and a rotational angular velocity of the hydraulic motor; a flow control valve which is provided between the hydraulic motor and the hydraulic pump and has a shutting position for shutting off the hydraulic motor from the hydraulic pump while being adapted to be opened so as to allow a hydraulic fluid to be supplied from the hydraulic pump to the hydraulic motor at a flow rate corresponding to an opening of the flow control valve; a flow control valve actuator which increases the opening of the flow control valve based on the operation of the slewing operation member; pressure control valves each of which receives an input of a pressure command signal from outside, the pressure control valves provided at an inlet side and an outlet side of the hydraulic motor respectively to limit respective maximums of an inlet pressure and an outlet pressure to respective set values corresponding to the respective pressure command signals; a braking operation member which is operated to brake the slewing motion of the slewing structure; a motor side pressure controller which inputs the pressure command to each of the pressure control valves to retain the set value of the motor inlet side pressure control valve so as to allow the hydraulic motor to be driven and let the set value of the motor outlet side pressure control valve be a set value which produces a braking torque corresponding to the braking operation member; and a valve opening limiter which reduces the opening of the flow control valve to an opening smaller than the opening corresponding to the operation amount of the slewing operation member corresponding to the operation of the braking operation member.

DESCRIPTION OF THE PREFERRED EMBODIMENTS

There will be described a preferred embodiment according to the invention. In this embodiment, the invention is applied to a crane as shown in FIG. 1; however, the invention is not limited to this but can be applied any working machine having a slewing structure hydraulically driven to be slewed: for example, a hydraulic excavator having a slewing upper structure.

Figure 1:
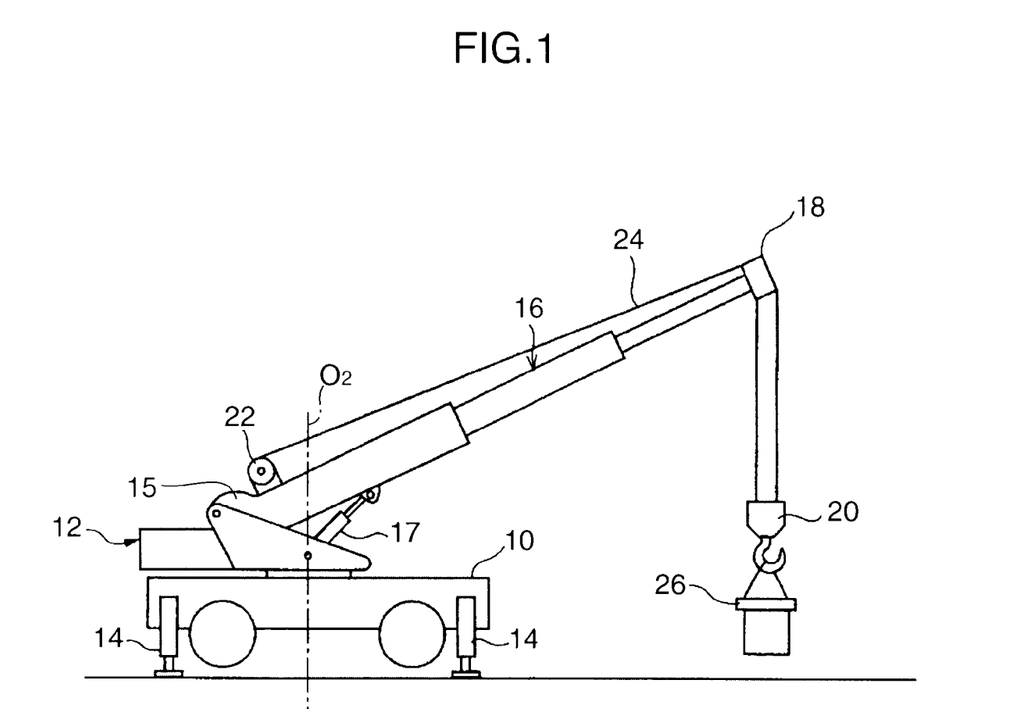
FIG. 1 is a front view schematically showing a crane as a slewing type working machine according to embodiments of the present invention.

FIG. 1 shows a summary of the crane. The crane comprises a base carrier 10 and an slewing upper structure 12 supported on the base carrier 10 and allowed to slew around a vertical axis Oz. The base carrier 10 is provided with outriggers 14 capable of overhanging to right and left sides. The slewing upper structure 12 includes a boom support member 15, a extendable boom 16, and a cylinder 17 for raising and falling the boom 16. The boom 16 has a basal end, which is connected to the boom support member 15 so as to be allowed to rotate around a horizontal axis (to enable the boom 16 to be raised and fallen).

The boom 16 has a free end 18, from which a hoisting attachment 20 is suspended. Specifically, the boom 16 supports a winch 22 on a back surface of the basal end thereof, and a rope 24 is dispensed from the winch 22 to be thread between the free end 18 and the hoisting attachment 20. The hoisting attachment 20 has a hook for hanging a hoist load 26.

Figure 2:
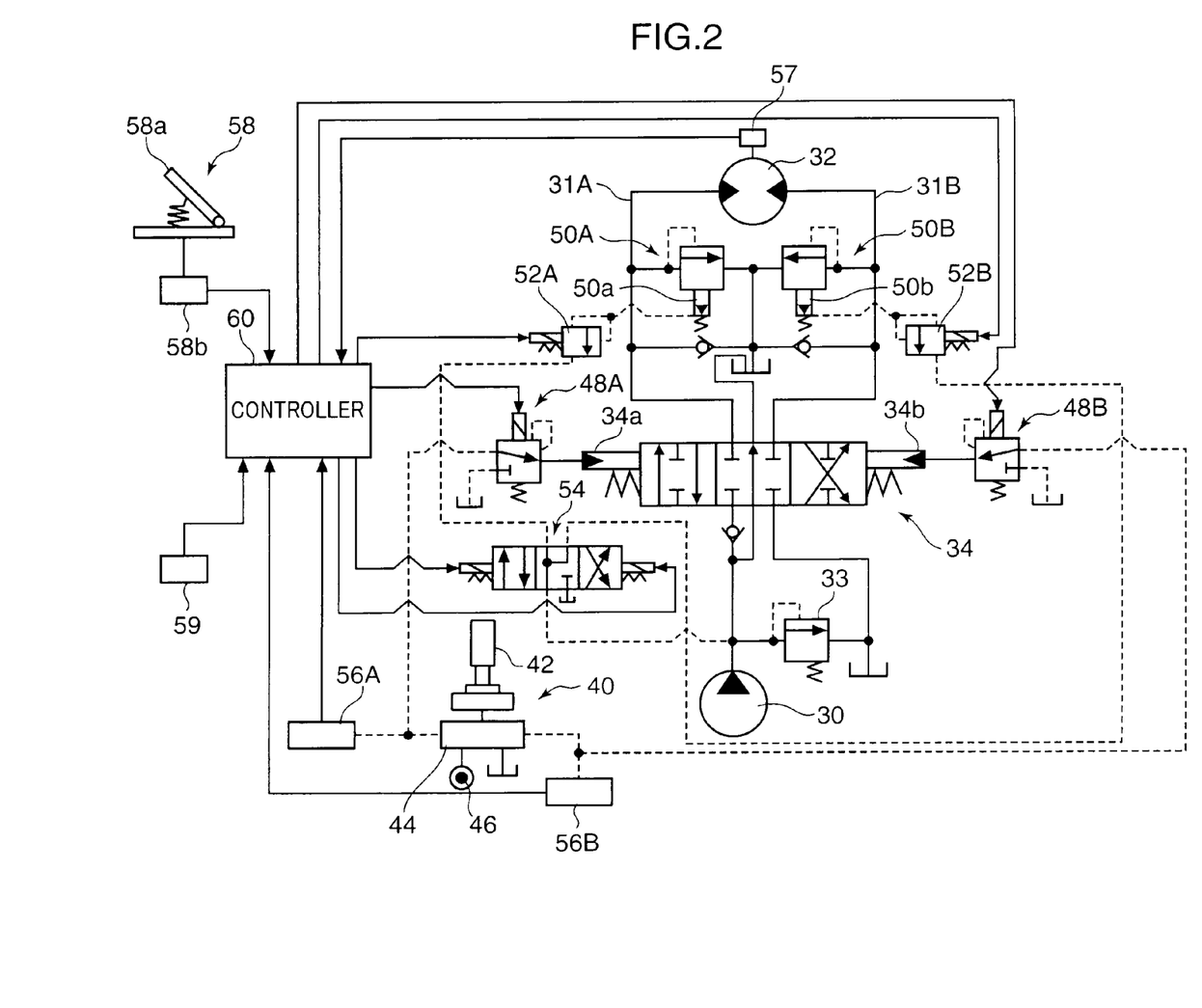
FIG. 2 is a diagram showing a hydraulic motor and a hydraulic circuit for driving the motor according to the first embodiment of the present invention.

The base carrier 10 is provided with an engine not shown and a hydraulic circuit for driving the slewing upper structure 12 to be slewed by power output from the engine. The hydraulic circuit, as shown in FIG. 2, includes a hydraulic pump 30, a hydraulic slewing motor 32, and a control valve 34.

The hydraulic pump 30 is driven by the engine, discharging a hydraulic oil to supply it to the hydraulic slewing motor 32. The hydraulic pump 30 discharges the oil into a discharge line, to which a main relief valve 33 is connected. The main relief valve 33 limits the discharge pressure of the hydraulic pump 30, which is a pump pressure, to a certain pressure.

The slewing motor 32 has an output shaft connected to the slewing upper structure 12 and a pair of ports 32a and 32b, to one of which the hydraulic oil is supplied. This supply actuates the motor 32 to slew the slewing upper structure 12 in a direction corresponding to the direction of the supply. Specifically, the flow of the hydraulic oil from one port to the other port rotates the output shaft of the hydraulic slewing motor 32, thus slewing the slewing upper structure 12 at an angular velocity corresponding to the flow rate of the hydraulic oil, i.e., to a motor flow rate, and in a direction corresponding to the flow direction of the hydraulic oil.

The control valve 34 is provided between the hydraulic pump 30 and the hydraulic slewing motor 32. The control valve according to this embodiment is formed of a pilot controlled hydraulic selector valve with three positions and six ports, serving as both of a directional control valve for selecting a supply direction of the hydraulic oil from the hydraulic pump 30 to the hydraulic slewing motor 32 and a flow regulating valve for varying the flow rate of the hydraulic oil.

Specifically, the control valve 34 has a sleeve not shown and a spool slidably inserted into the sleeve. The spool is shifted between a neutral position shown as a center position and supply positions shown as right and left positions in FIG. 2. At the neutral position, the spool intercepts the path between the hydraulic pump 30 and the hydraulic slewing motor 32, that is, shuts off the hydraulic slewing motor 32 from the hydraulic pump, while forming a hydraulic path for letting the hydraulic oil into a tank. At the left supply position shown in FIG. 2, the spool forms a hydraulic path for introducing the discharged oil from the hydraulic pump 30 into the port 32a of the hydraulic slewing motor 32 through a motor line 31A and letting the hydraulic oil discharged from the port 32b into the tank through a motor line 31b. On the contract, at the right supply position shown in FIG. 2, the spool forms a hydraulic path for introducing the discharged oil from the hydraulic pump 30 into the port 32b of the hydraulic slewing motor 32 through the motor line 31B and letting the hydraulic oil discharged from the port 32a into the tank through the motor line 31A. The opening area of the path formed at each of the supply positions is increased by an increase in the sliding stroke of the spool.

The control valve 34 has a pair of pilot ports 34a and 34b, into each of which a pilot pressure is input. The pilot pressure input to the pilot ports 34a shifts the control valve 34 from the neutral position to the first supply position by a stroke corresponding to the pilot pressure; on the contrary, the pilot pressure input to the pilot ports 34b shifts the control valve 34 from the neutral position to the second supply position by a stroke corresponding to the pilot pressure.

The crane has a cab, which contains a operating device 40 for operating the control valve 34. The operating device 40 has a control lever 42, which is an slewing operation member; a remote-control valve 44 connected to the control lever 42; and a pilot pump 46 for supplying the pilot pressure to the control valve 34. The control lever 42 is installed in the cab to be fallen down to right and left for slewing the slewing upper structure 12. The remote-control valve 44 is located between the pilot pump 46 and the pilot ports 34a and 34b, outputting the pilot pressure corresponding to the operation stroke of the control lever 42 toward the pilot port corresponding to the falling direction, i.e., operating direction, of the control lever 42. This means that the remote control valve 44 constitutes a section of supplying pilot pressure in cooperation with the pilot pump 46.

This embodiment involves a pair of pilot pressure regulating valves 48A and 48B, which are provided in respective pilot lines from the remote control valve 44 to the pilot ports 34a and 34b. The pilot pressure regulating valves 48A and 48B limits the pilot pressure input into the pilot port 34a or 34b by the operation of the control lever 42 to a set pressure regardless the operation stroke of the control lever 42, for braking the slewing of the slewing upper structure as described below. Each of the pilot pressure regulating valves 48A and 48B, which are formed of a proportional electromagnetic regulating valve with a solenoid in this embodiment, limits an outlet pressure of itself to a pressure proportional to an electric signal input into the solenoid thereof regardless of the input pressure of itself, i.e., the outlet pressure of the remote control valve 44, supplying the limited pressure as the pilot pressure to the pilot port 34a or 34b.

To the motor lines 31A and 31B, which are supply lines for connecting the ports 32a and 32b to the output port of the control valve 34 respectively, are connected respective pressure control valves 50A and 50B for controlling a inlet pressure and outlet pressure of the hydraulic motor 32. The pressure control valves 50A and 50B are formed of respective hydraulic pilot controlled variable relief valves, specifically, having respective pilot ports 50a and 50b, each of which receives a pilot pressure for relief control. Each of the pressure control valves 50A and 50B is opened when the inlet pressure thereof comes over a set pressure corresponding to the pilot pressure input into its pilot port 50A or 50B: the set pressure is a relief pressure.

This apparatus involves, as a relief pressure controller, a pair of relief pressure control valves 52A and 52B and a path selector valve 54 downstream from the valves 52A and 52B.

Each of the relief pressure control valves 52A and 52B, according to this embodiment, is formed of a proportional electromagnetic relief valve. Specifically, each of them has a solenoid into which a relief pressure command signal, i.e., a relief pressure command current, is input, being adapted to be opened when the inlet pressure of itself comes over a pressure corresponding to the relief pressure command signal. In other words, each of the relief pressure control valves 52A and 52B limits the relief pilot pressure to one under the pressure given by the relief pressure command current.

The path selector valve 54, positioned between a group of both of the relief control valves 52A and 52B and a group of the hydraulic pump 30 and the tank, provides a selection of hydraulic paths downstream of the relief control valves 52A and 52B. The path selector valve 54 according to this embodiment is formed of a three-position proportional electromagnetic selector valve, having a neutral position shown as a center position, a first position shown as a left position, and a second position shown as a right position. At the neutral position, the path selector valve 54 opens a hydraulic path for introducing the discharge pressure from the hydraulic pump 30, namely the pump pressure, into the pilot ports 50$a$ and 50$b$ of the respective pressure control valves 50A and 50B through the respective relief pressure control valves 52A and 52B. At the first position, the path selector valve 54 opens a hydraulic path for introducing the pump pressure into the pilot port 50$a$ of the pressure control valve 50A through the relief pressure control valve 52A while letting the pilot port 50$b$ of the pressure control valve 50B to the tank through the relief pressure control valve 52B. At the second position, the path selector valve 54 opens a hydraulic path for introducing the pump pressure into the pilot port 50$b$ of the pressure control valve 50B through the relief pressure control valve 52B while letting the pilot port 50$a$ of the pressure control valve 50A to the tank through the relief pressure control valve 52A.

Figure 3:
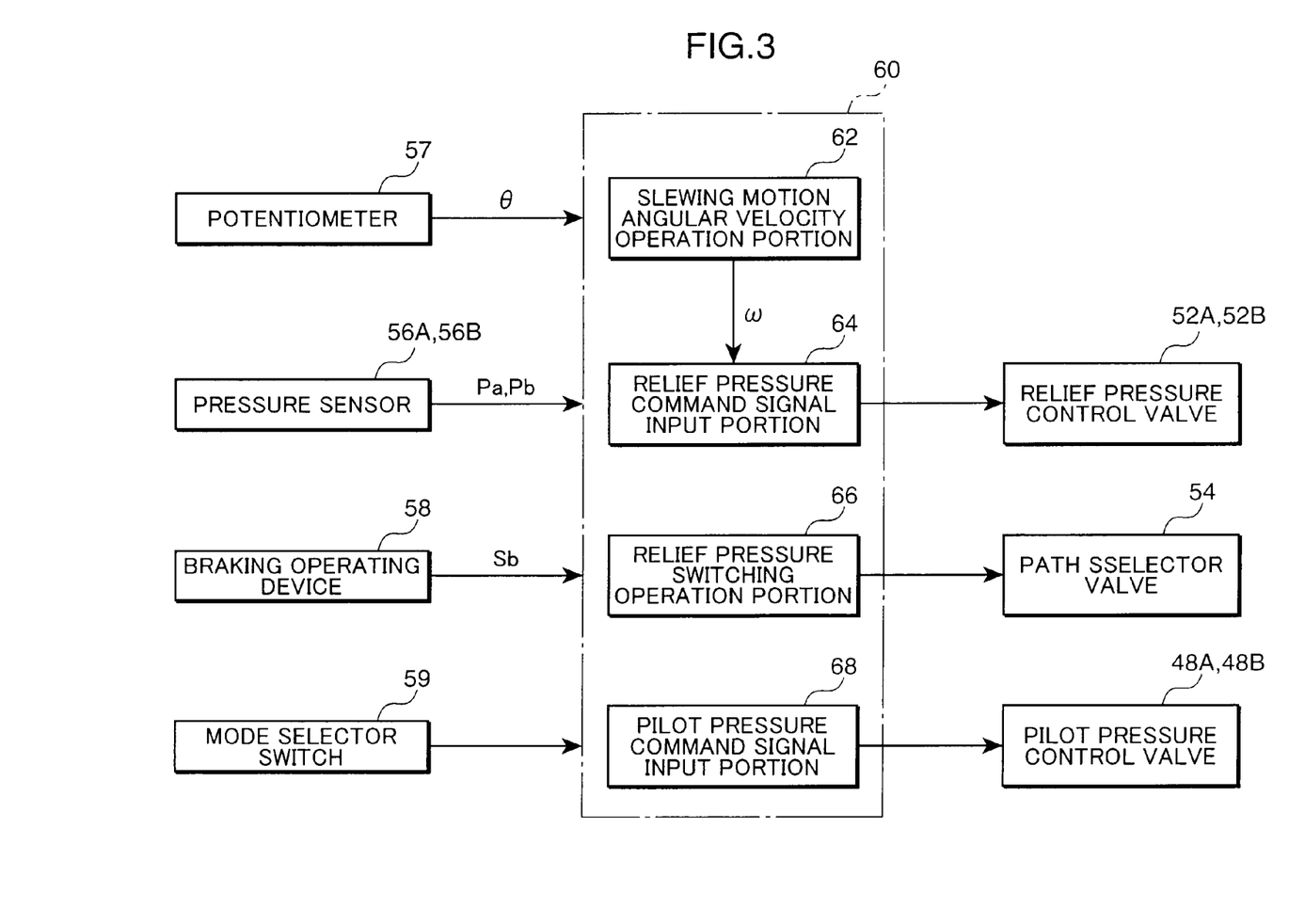
FIG. 3 is a block diagram showing functions of a controller for controlling the drive of the hydraulic motor.

This crane is provided with various types of sensors: included as the sensors for the below-mentioned slewing braking control are potentiometer 57 as shown in FIGS. 2 and 3, and a pair of pressure sensors 56A and 56B. The potentiometer 57 is connected to the output shaft of the hydraulic motor 32 to output a detection signal corresponding to a rotational angular position of the output shaft, that is, corresponding to a slewing angular position $\theta$ of the slewing upper structure 12. The pressure sensors 56A and 56B output detection signals corresponding to the hydraulic pressures output from the respective ports of the remote control valve 44, that is, hydraulic pressures corresponding to the operation direction and the operation stroke of the control lever 42. These detection signals teach the operation direction of the control lever, that is, the slewing direction of the slewing upper structure 12.

On the other hand, the cab contains, in addition to the control lever 42. a braking operating device 58 and a mode selector switch 59.

The braking operating device 58 has a brake pedal 58$a$, which is a braking operation member and depressed for the slewing braking, and a pedal detecting potentiometer 58$b$.

The mode selector switch 59 is operated to switch a control mode of the braking control apparatus between a braking operation priority mode and a slewing operation priority mode, adapted to output a mode specifying signal for the mode selection. The braking operation priority mode gives a higher priority to the braking operation of the braking operating device 58 when the braking operation and the slewing operation of the control lever 42 is performed at the same time. The slewing operation priority mode gives a higher priority to the slewing operation.

The control performance in each of the modes is made by a controller 60, which is, for example, formed of a microcomputer to make a computation for slewing braking control, according to the input of the detection signals of the sensors and the output signals from the braking operation device 58 and the mode selector switch 59.

The controller 60 has functions for the slewing braking control as shown in FIG. 3: a slewing angular velocity operation portion 62, a relief pressure command input portion 64, a relief pressure switching portion 66 and a pilot pressure command input portion 68.

The slewing angular operating portion 62 performs an operation on a slewing angular velocity $\omega$, which is a rate of change of the slewing angular position $\theta$ with time, thus constituting the slewing motion detector in cooperation with the potentiometer 57.

The relief pressure command input portion 64 inputs a relief pressure command current, i.e., a relief pressure command signal, into the relief pressure control valve corresponding to the pressure control valve at the outlet side of the hydraulic motor 32: for example, in the case of rightward slewing, the relief pressure control valve 52B corresponding to the pressure control valve 50B shown at right side in FIG. 2. This input is performed so as to generate the braking torque corresponding to the signal output from the potentiometer 58$b$ of the braking operating device 58, that is, a signal on a depressing operation amount Sp on the brake pedal 58$a$.

The relief pressure of the inlet side pressure control valve exerts no influence on the slewing braking; however, the relief pressure command input portion 64 according to this embodiment produces a common relief pressure command signal for both of the relief pressure control valve 52A and 52$b$, in order to simplify the computation on the relief pressure command.

The relief pressure switching portion 66 inputs the solenoid of the path selector valve 54 to switch its position, according to the slewing direction of the slewing upper structure 12, i.e., the operating direction of the control lever 42, which is recognized by the output signals from the pressure sensor 56A and 56B. Specifically, the relief pressure switching portion 66 makes the following switching performance a to c, according to the position of the control lever 42: a) keeping the path selector valve 54 at the neutral position when the control lever 42 stays at its neutral position; b) shifting the path selector valve 54 to the first position when the control lever 42 is operated to the direction for leftward slewing, that is, when the control valve 34 is shifted to the left supply position to drive the hydraulic motor 32 in such a direction that the pressure control valves 50A becomes positioned at inlet side of the motor 32 while the pressure control valves 50B becomes positioned at outlet side of the motor 32; and c) shifting the path selector valve 54 to the second position when the control lever 42 is operated to the direction for rightward slewing, that is, when the control valve 34 is shifted to the right supply position to drive the hydraulic motor 32 in such a direction that the pressure control valves 50B and 50A become positioned at inlet and outlet sides of the motor 32 respectively.

The pilot pressure command input portion 68, as a general rule, produces a pilot pressure command signal based on the depressing operation amount Sp and the engine SPEED, and inputs the pilot pressure command signal into the solenoid of the pilot pressure regulating valve corresponding to the operation direction of the control lever, that is, for example, the left pilot pressure regulating valve 48A in the case of the operation direction for leftward slewing. The opening of the control valve 34 is thus limited according to the amount Sp.

The pilot pressure command input portion 68, in an exceptional case of that the slewing operation priority mode is selected by the mode selector switch 59, makes no performance of the above-mentioned production and input of the pilot pressure command signal, regardless of the operation of the brake pedal 58a. In other words, the pilot pressure command input portion 68 performs the pilot pressure command input to limit the pilot pressure, i.e., to limit the opening of the control valve 34, only in the braking operation priority mode.

Figure 4:
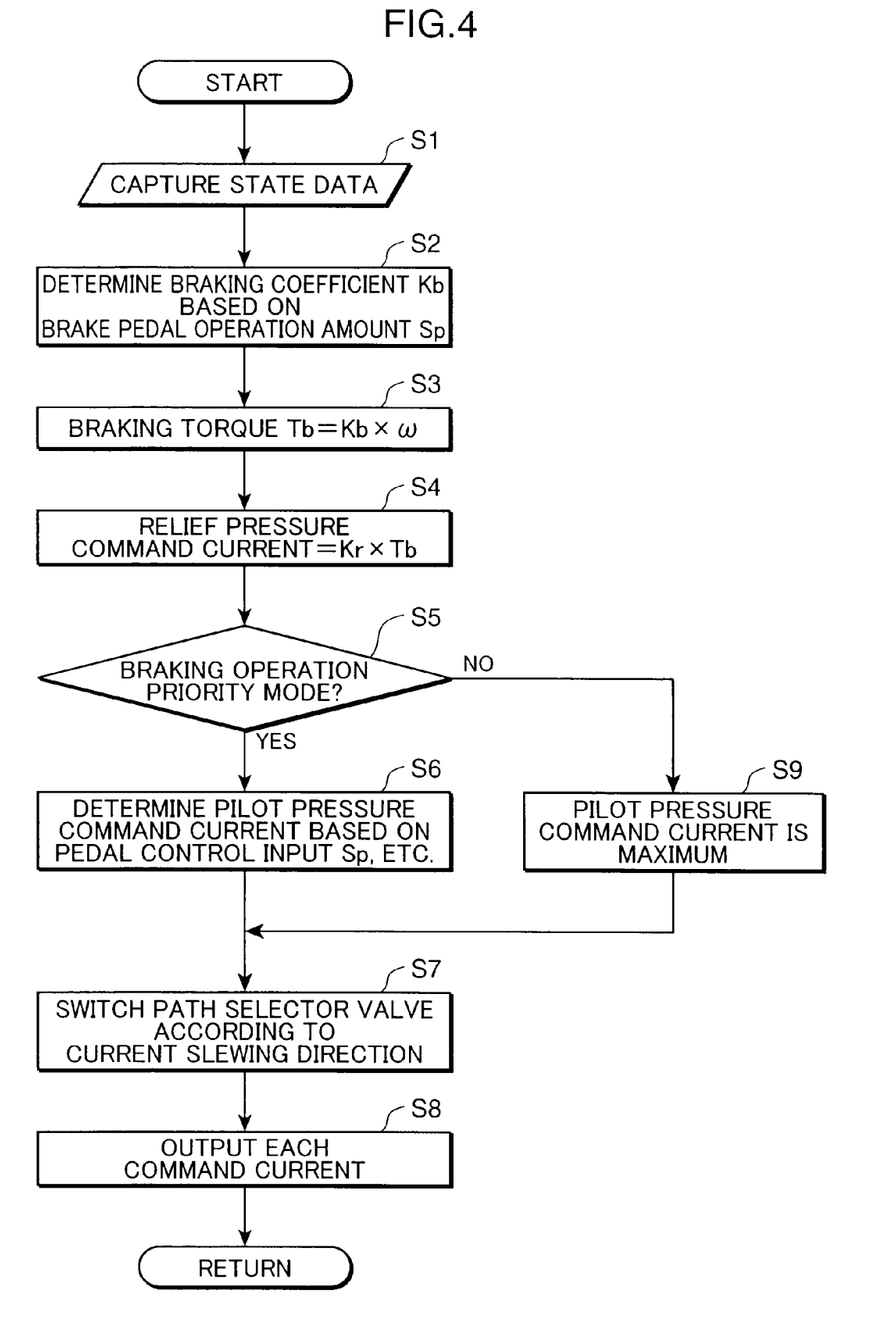
FIG. 4 is a flowchart showing the computation of the controller.
Figure 5:
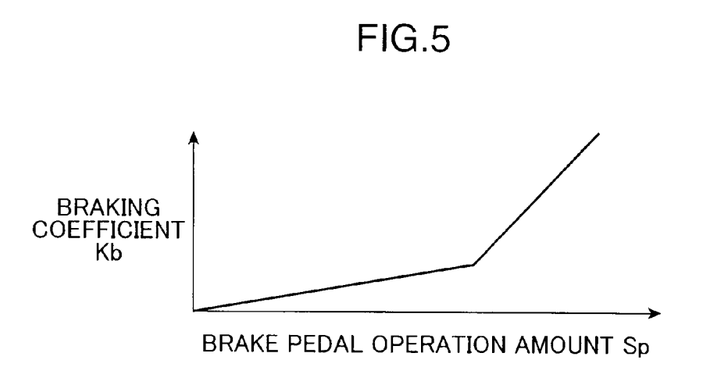
FIG. 5 is a graph showing the relationship between the braking coefficient and the brake pedal control amount to be determined.
Figure 6:
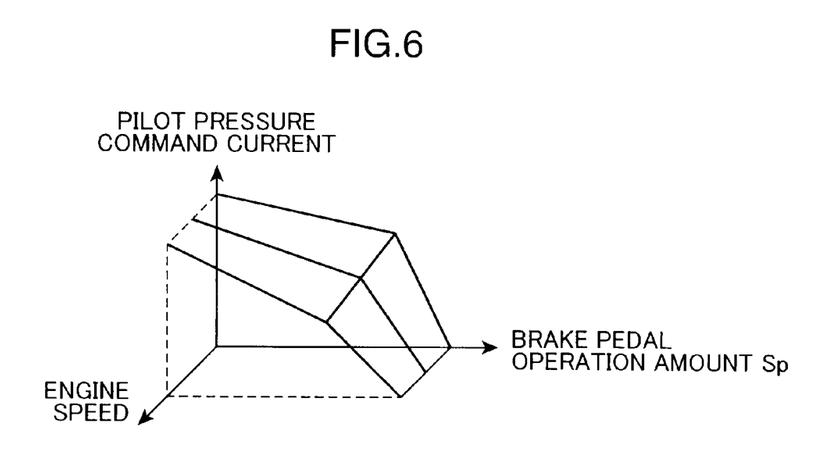
FIG. 6 is a graph showing the relation of the pilot pressure command current to be determined by the controller and the brake pedal control amount and the engine speed.

Next will be specifically described the computing performance by the controller 60, with reference to the flow chart in FIG. 4 and the graphs in FIGS. 5 and 6.

1) Capture of State Data (Step S1 in FIG. 4)

The controller 60 captures state data including not only the amounts detected by the sensors but also the operation stroke of the control lever 42 and the depressing operation amount Sp of the brake pedal 58a.

2) Determination of the Relief Pressure Command Current (Steps S2 to S4 in FIG. 4)

The relief pressure command signal input portion 64 determines a braking torque Tb by the calculation based on the depressing operation amount Sp.

At first, determined is a braking coefficient Kb for the calculation on the following braking torque Tb (Step S2). The braking coefficient Kb is set to a value increased with the operation amount Sp. Specifically, the relief pressure command signal input portion 64 stores the relationship between the brake pedal operation amount Sp and the brake coefficient Kb as a equation or a table, and determines the brake coefficient Kb based on the relationship and the detected amount Kb.

Then, the relief pressure command signal input portion 64 determines the braking torque Tb by multiplying the slewing angular velocity ω by the braking coefficient Kb (Step S3), and determines the relief pressure command current for generating the braking torque Tb. Specifically, the braking torque Tb is multiplied by an appropriate coefficient Kb to obtain the relief pressure command current.

Although the relief pressure command current is determined basically to operate the relief pressure of the motor outlet side one of the pressure control valves 50A and 50B, only a common relief pressure command current is determined for both of the pressure control valves 50A and 50B in this embodiment; thus the determining operation is simplified. This commonality is allowed by no essential influence of the relief pressure of the motor inlet side pressure control valve on the braking control.

3) Determination of the Pilot Pressure Command Current (Steps S5 and S6)

When the braking operation priority mode is selected by the mode selector switch 59 (YES at Step S5), the pilot pressure command signal input portion 68 of the controller 60 determines the pilot pressure command current corresponding to the operation amount Sp of the brake pedal 58a. The pilot pressure command signal input portion 68 according to this embodiment stores a map as shown in FIG. 6, and determines the pilot pressure command current corresponding to the operation amount Sp and the engine SPEED based on the map. In this embodiment, the smaller the operation amount Sp and the lower the engine SPEED, the higher current is determined.

When the slewing operation priority mode is selected (NO at Step S5), the pilot pressure command input portion 68 sets the pilot pressure command current to the maximum value, regardless of the operation amount Sp of the brake pedal 58a. Accordingly, this case involves no limitation of the flow control pilot pressure by the pilot pressure command input portion 68 and the pilot pressure regulating valves 48A and 48B.

4) Switching of the Path Selector Valve 54 and Output of the Command Currents (Steps S7 and S8)

The relief pressure switching portion 66 shifts the path selector valve 54 according to the current slewing direction, that is, based on the operating direction of the control lever 42, to introduce the pump pressure into the pilot port of the motor inlet side pressure control valve of the both of the pressure control valve 50A and 50B and allow the pilot port of the motor outlet side pressure control valve to be communicated with the tank (Step S8). Then, the relief pressure command input portion 64 and the pilot pressure command input portion 68 input the solenoid of the relief pressure control valve 52A or 52B and the solenoid of the pilot pressure regulating valve 48A or 48B, respectively (Step S9).

The above-mentioned operation of the controller 60 enables an operator to make a slewing operation and a slewing braking operation which can be easily grasped through intuition as described below.

At first is assumed a case that the braking operation priority mode is selected as the control mode (YES at Step S5). In this case, when no braking operation is performed, i.e., when the operation amount Sp of the brake pedal 58a is zero, the controller 60 inputs the maximum value of the pilot pressure command signal to each of the pilot pressure regulating valves 48A and 48B (Step S6 in FIG. 4, and FIG. 6), not allowing the pilot pressure regulating valves 48A and 48B to limit, or regulate, the flow control pilot pressure. On the other hand, the relief pressure command current is zero (Step S4), which keeps both of the relief pressure control valves 50A and 50B open.

Upon the operation of the control lever 42 in this condition, the flow control pilot pressure corresponding to the operation stroke of the control lever 42 is supplied to one of the pilot ports 34A and 34B of the control valve, which pilot port is corresponding to the operation direction. This pilot pressure opens the control valve 34 by an opening degree corresponding to the pilot pressure, thus allowing the hydraulic oil to be supplied to the hydraulic motor 32 from the port corresponding to the operation direction at the flow rate corresponding to the operation stroke.

On the other hand, the controller 60 shifts the path selector valve 54 to the position corresponding to the operation direction of the control lever 42; for example, the path selector valve 54 is shifted to the left position in FIG. 2 when the control lever 42 is operated in such a leftward slewing direction that the control valve 50A becomes a motor inlet side one (Step S7 in FIG. 4). Thus shifted valve 54 opens the following paths: A) a path allowing the pump pressure to be introduced into the pilot port of the motor inlet side pressure control valve through the relief pressure control valve, for example, a path allowing the pump pressure to be introduced into the pilot port 50a of the pressure control valve 50A through the relief pressure control valve 52A; and B) a path allowing the pilot port of the motor outlet side pressure control valve to be communicated with the tank through the relief pressure control valve, for example, a path allowing the pilot port 50b of the pressure control valve 50B to be communicated with the tank through the relief pressure control valve 52B. These paths ensures a motor inlet pressure enough to drive the hydraulic motor 32 by the hydraulic oil supply, while expanding the minimum of the relief pressure range of the motor outlet side control valve to the tank pressure.

To brake the thus driven slewing upper structure 12 at a preferable deceleration, the conventional apparatus has required such a difficult operation of bring the control lever close to the neutral position with a fine adjustment. Meanwhile, the apparatus according to this embodiment permits an operator to make a suitable braking with no operation of the control lever 42 but only a depressing operation of the brake pedal 58a by an operation amount Sp corresponding to the desirable deceleration.

Specifically, upon the depression, the controller 60 computes to determine the pilot pressure command current corresponding to the depressing operation amount Sp (Step S6 in FIG. 4, and FIG. 6), and inputs it into the solenoid of one of the pilot pressure regulating valves 48A and 48B, the one corresponding to the slewing direction (Step S8 in FIG. 4). As shown in FIG. 6, the greater the operation amount Sp, the less pilot pressure command current is determined to lower the outlet pressure of the pilot pressure regulating valve. Thus, the stroke of the control valve 34 from the neutral position is reduced to decrease its opening, increasing an interception rate of the hydraulic motor 32 from the hydraulic pump 30 and the tank, that is, a degree of trapping the oil in the hydraulic motor 32.

On the other hand, the controller 60 computes to determine the braking torque Tb and the relief pressure command current corresponding thereto (Steps S2 to S4 in FIG. 4), and inputs it to the solenoid of one of the relief pressure control valves 52A and 52B, the one corresponding to the outlet side pressure control valve. This establishes braking the rotation of the rotating output shaft of the hydraulic motor 32 and the slew motion of the slewing upper structure at the deceleration corresponding to the operation amount Sp. This allows the operator to brake the slewing upper structure with no operation of the control lever 42 but only a depression of the brake pedal 58a, at the deceleration corresponding to the depressing operation amount Sp.

In the case that the slewing operation priority mode is selected as the control mode (NO at Step S5), the controller 60 keeps the pilot pressure command current for both of the pilot pressure regulating valves 48A and 48B maximum (Step S9). This means that the action of the control valve 34 depends on only an operation of the control lever 42, regardless of the depression of the brake pedal 58a. In other words, the acceleration and the deceleration of the slewing upper structure 12 is performed only by the operation of the control lever 42. The operation of the mode selector switch 59 permits the operator to select a comfortable control mode for him.

The invention allows various types of circuits to be applied to the circuit for controlling the relief pressures of the pressure control valves 50A and 50B.

Figure 7:
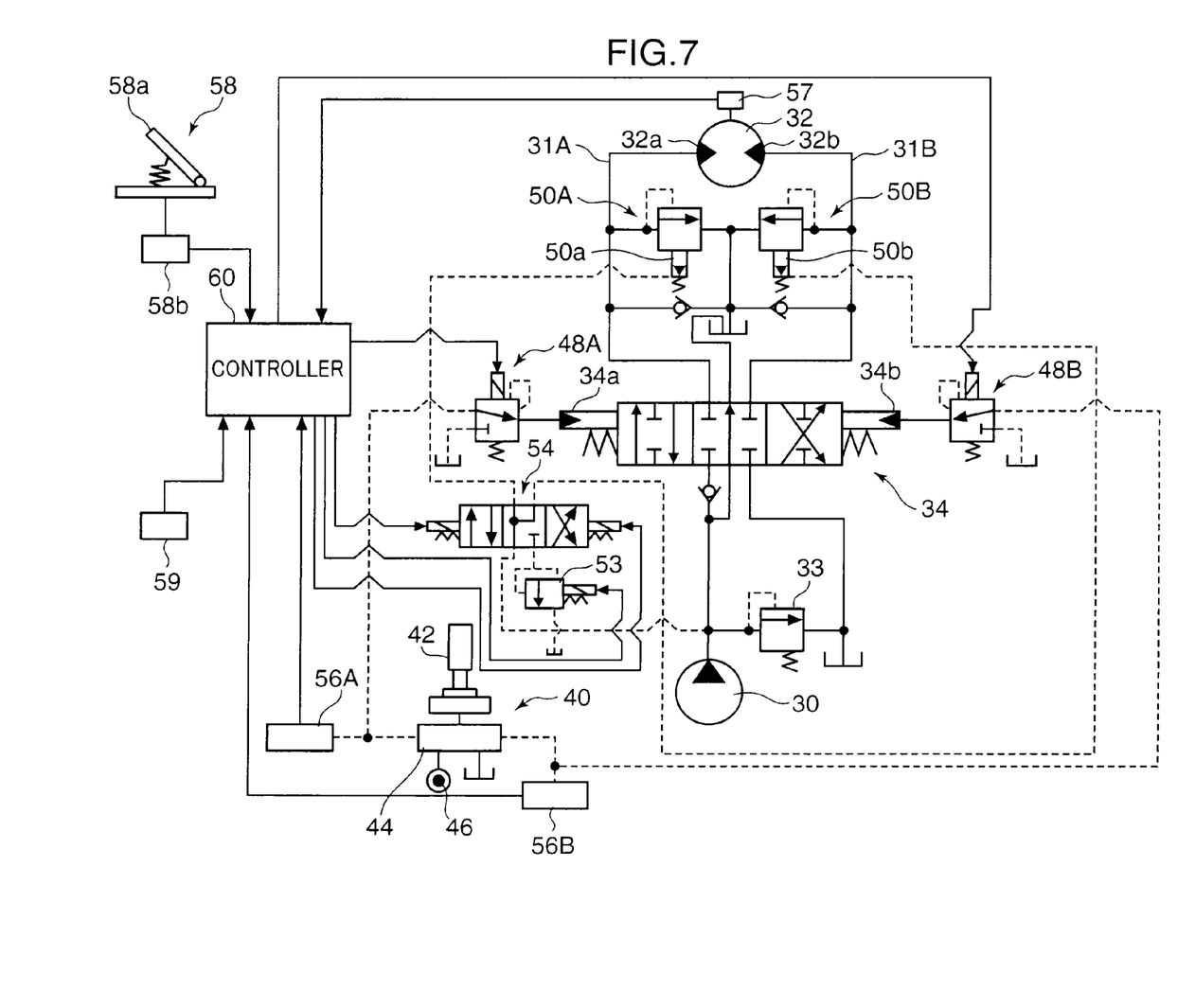
FIG. 7 is a diagram showing a hydraulic motor and a hydraulic circuit for driving the motor according to the second embodiment of the present invention.

For example, FIG. 7 shows a circuit according to a second embodiment of the invention, in which both of the above relief pressure control valves 52A and 52B is omitted and a single relief pressure valve 53 is provided at an outlet side of the path selector valve 54, namely the tank side, instead of the valves 52A and 52B. The relief pressure control valve 53, which can be formed of a proportional electromagnetic relief valve as with the relief pressure control valves 52A and 52B, is located between the path selector valve 54 and the tank to be used as a common valve for relief pressure controls of both of the pressure control valves 50A and 50B.

Means of ensuring the inlet pressure of the hydraulic motor 32, that is, ensuring the relief pressure of the inlet side pressure control valve, is not limited to the one utilizing the pump pressure of the hydraulic pump 30 as shown in the above first and second embodiments. For example, there may be provided a pump only for ensuring the relief pressure, in addition to the hydraulic pump 30, namely a main pump.

Figure 8:
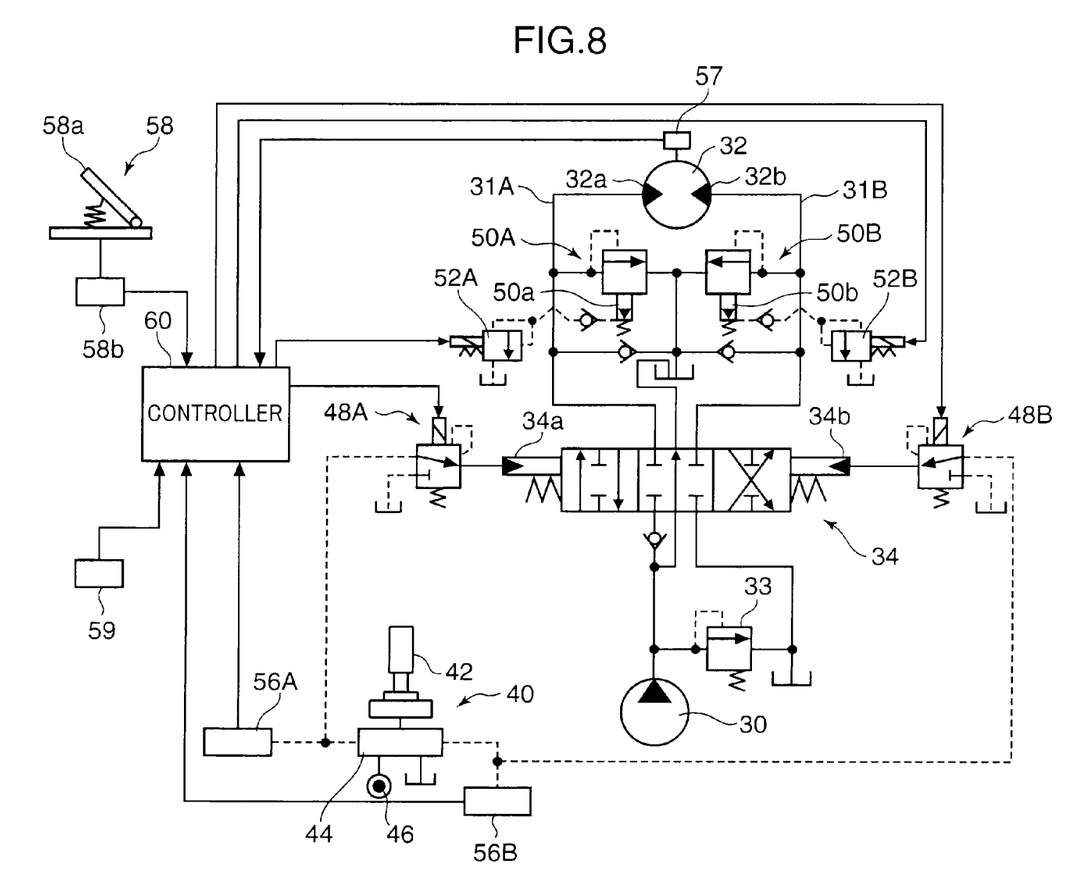
FIG. 8 is a diagram showing a hydraulic motor and a hydraulic circuit for driving the motor according to the third embodiment of the present invention.

FIG. 8 shows a circuit according to a third embodiment of the invention. This circuit does not include the path selector valve 54. It includes both of the relief pressure valves 52A and 52B, but both the outlets thereof are connected to a tank, while a check valve is provided at the inlet side thereof. Such connections of the outlets of both of the control valves 52A and 52B to the tank as the third embodiment is permitted, in the case where the motor inlet pressure required for driving the hydraulic motor 32 is low, or where each of the relief pressure control valves 52A and 52B has enough capacity for ensuring the inlet pressure. In such a case, enough motor inlet pressure for slewing with no braking is ensured by the reduction of the opening of the inlet side relief pressure control valve, that is, by the increase in the relief pressure command current.

Figure 9:
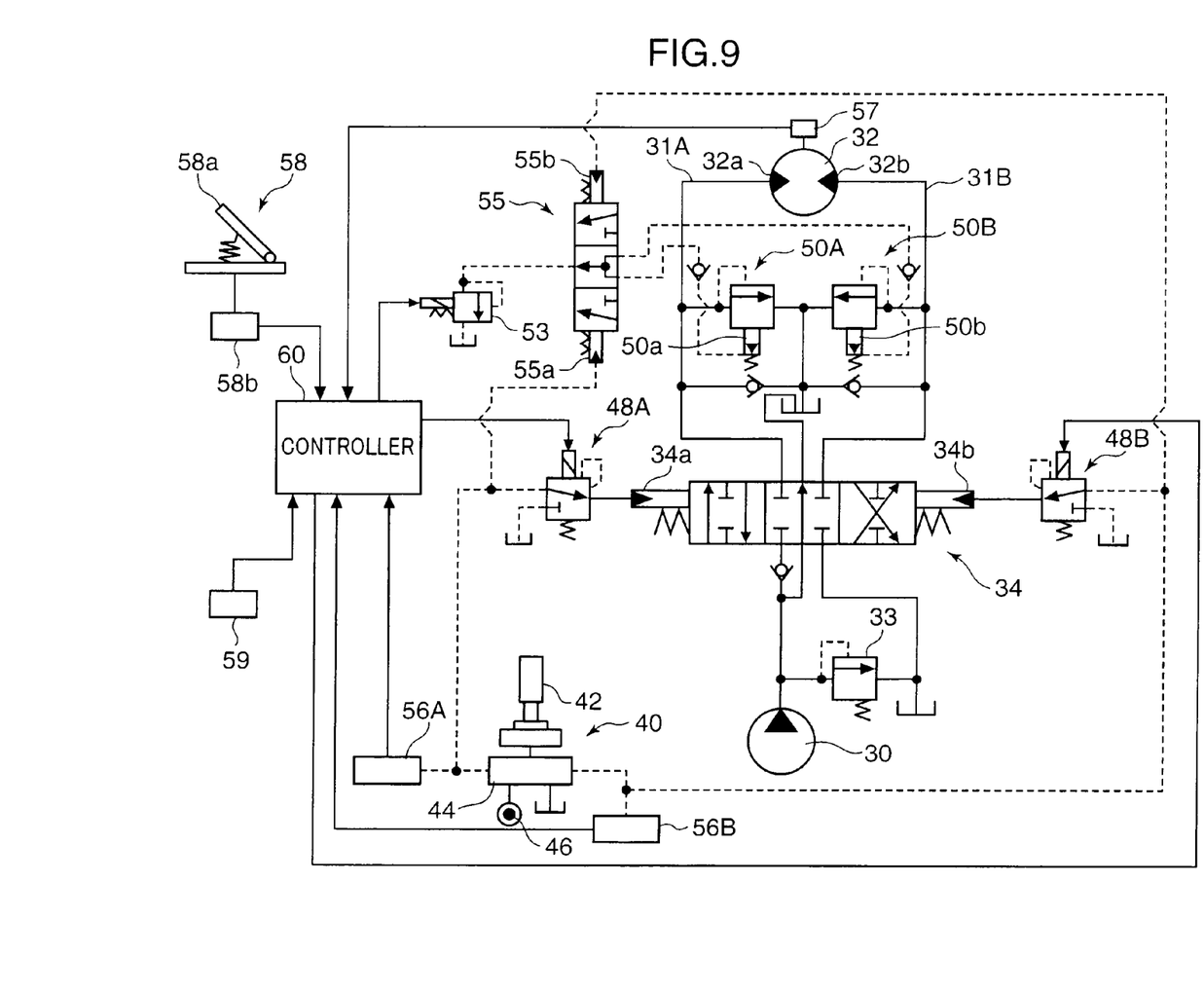
FIG. 9 is a diagram showing a hydraulic motor and a hydraulic circuit for driving the motor according to the fourth embodiment of the present invention.

FIG. 9 shows a circuit according to a fourth embodiment of the invention. Most of this circuit is equal to that of the circuit according to the second embodiment shown in FIG. 7, except a path selector valve 55 for introduction of the pump pressure and two check valves: the path selector valve 55 replaces the path selector valve 54 shown in FIG. 7, and the check valves are provided between the path selector valve 54 and the pilot ports 50a and 50b of the pressure control valves 50A and 50b respectively.

The path selector valve 55 is formed of a pilot controlled three-position selector valve, having a pair of pilot ports 55a and 55b. The pilot port 55a is connected to a pilot line which is communicated with the pilot port 34a of the control valve 34 and positioned at an inlet side of the pilot pressure regulating valve 48A, and the pilot port 55b is connected to a pilot line which is communicated with the pilot port 34b of the control valve 34 and positioned at an inlet side of the pilot pressure regulating valve 48A.

When the pilot pressure is not supplied to either of the pilot ports 55a and 55b; that is, when the control lever 42 stays at the neutral position, the path selector valve 55 keeps its center valve position for connecting both of the pilot ports 50a and 50b of the pressure control valves 50A and 50B to the tank-side relief pressure control valve 53. Upon an operation of the control lever 42 for a left slewing, the pilot pressure for flow rate control introduced into the pilot port 55a shifts the path selector valve 55 to a position, which is shown as a lower position in FIG. 9, for connecting the pilot port 50a of the pressure control valve 50A to the relief pressure control valve 53 to enable the relief pressure to be controlled while confining the pilot port 50b of the pressure control valve 50B. Upon an operation of the control lever 42 for a right slewing, the pilot pressure for flow rate control introduced into the pilot port 55b shifts the path selector valve 55 to a position, which is shown as a lower position in FIG. 9, for connecting the pilot port 50b of the pressure control valve 50B to the relief pressure control valve 53 to enable the relief pressure to be controlled while confining the pilot port 50a of the pressure control valve 50A.

Figure 10:
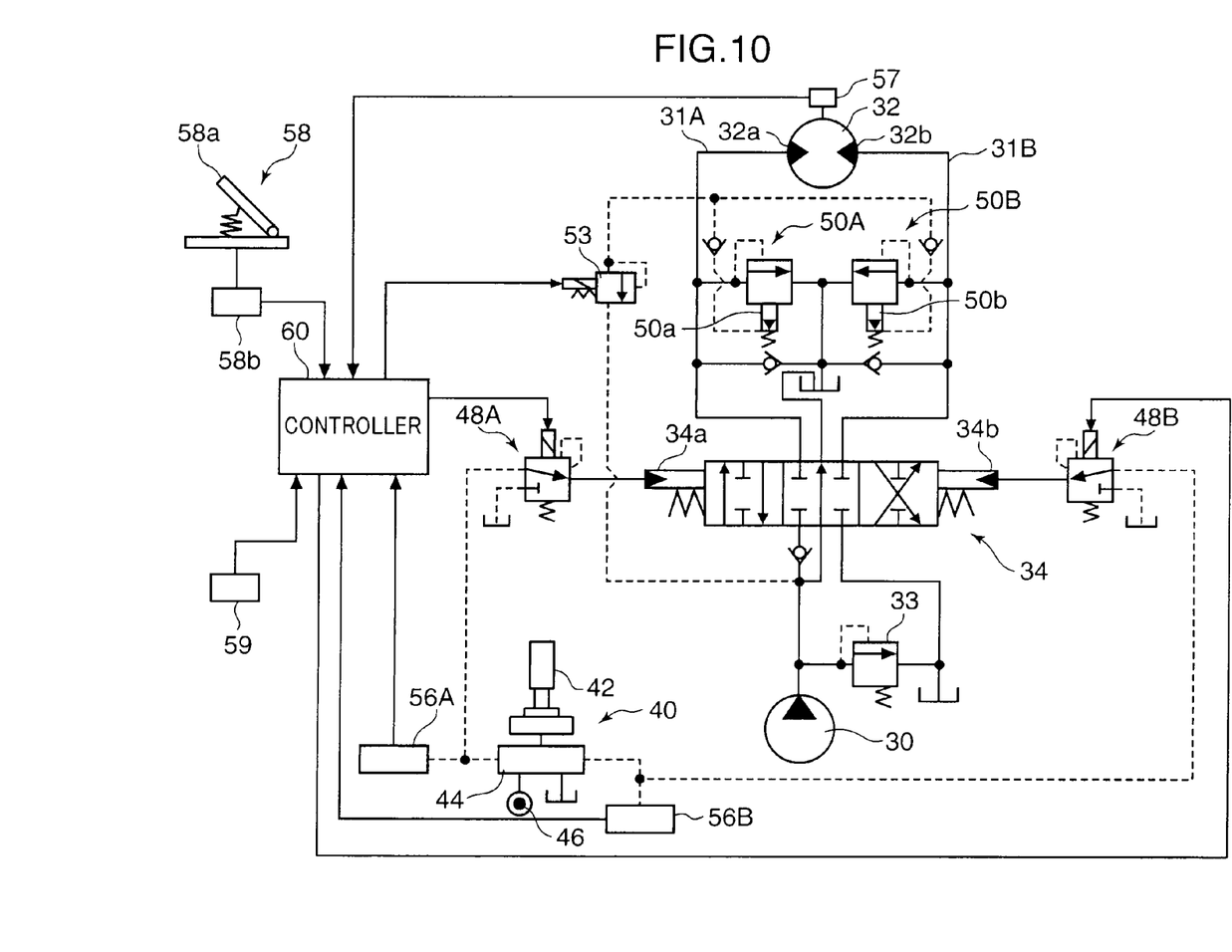
FIG. 10 is a diagram showing a hydraulic motor and a hydraulic circuit for driving the motor according to the fifth embodiment of the present invention.

Moreover, the path selector valve 55 shown in FIG. 9 may be omitted as shown in FIG. 10 illustrating the fifth embodiment of the present invention. Also the circuit shown in FIG. 10 includes pressure control valves 50A and 50B with the pilot ports 50a and 50b respectively, but both of the pilot ports 50a and 50b are connected to the discharged line from the hydraulic pump 30 through a common relief pressure control valve 53. This circuit can ensure the pilot pressure of each of the pressure control valves 50A and 50B no less than the pump pressure, and the single relief pressure control valve 53 can vary the relief pressures of both pressure control valves 50a and 50b simultaneously.

The present invention does not absolutely require the switching of the control mode. In other words, the invention includes also an embodiment in which the braking operation is given a priority on all occasions where the slewing operation and the braking operation are simultaneously performed.

For example, the above determination of the pilot pressure command current at step S6 in the flowchart of FIG. 4 may be always performed.

As described above, the present invention provides a braking control apparatus capable of giving a braking operation intuitively and easily grasped without a mechanical brake. This braking control apparatus is provided to a slewing type working machine including a slewing structure, a hydraulic motor for slewing the slewing structure, and a hydraulic pump for supplying a hydraulic fluid to the hydraulic motor, to control braking of the slewing structure. The braking control apparatus comprises: a slewing motion detector which detects information about a slewing angular velocity of the slewing structure; a slewing operation member which is operated to specify a rotation direction and a rotational angular velocity of the hydraulic motor; a flow control valve which is provided between the hydraulic motor and the hydraulic pump and has a shutting position for shutting off the hydraulic motor from the hydraulic pump while being adapted to be opened so as to allow a hydraulic fluid to be supplied from the hydraulic pump to the hydraulic motor at a flow rate corresponding to an opening of the flow control valve; a flow control valve actuator which increases the opening of the flow control valve based on the operation of the slewing operation member; pressure control valves each of which receives an input of a pressure command signal from outside, the pressure control valves provided at an inlet side and an outlet side of the hydraulic motor respectively to limit respective maximums of an inlet pressure and an outlet pressure to respective set values corresponding to the respective pressure command signals; a braking operation member which is operated to brake the slewing of the slewing structure; a motor side pressure controller which inputs the pressure command to each of the pressure control valves to keep the set value of the inlet pressure control valve so as to allow the hydraulic motor to be driven and let the set value of the outlet pressure control valve be a set value which generates a braking torque corresponding to the braking operation member; and a valve opening limiter which reduces the opening of the flow control valve to an opening smaller than the opening corresponding to the operation stroke of the slewing operation member corresponding to the operation of the braking operation member.

This apparatus allows an operator to perform a braking operation capable of being easily and intuitively grasped, by use of the slewing operation member and the braking operation member, with no mechanical brake.

Specifically, when the slewing operation member is operated, the flow control valve makes an open action, as with a standard slewing type working machine, in correspondence with the control amount to allow a hydraulic fluid to be supplied from a hydraulic pump to a hydraulic motor; thus, the slewing structure is driven to be slewed at a speed corresponding to the operation amount.

Upon an operation of the braking operation member during the foregoing slewing motion, the opening of the flow control valve is reduced corresponding to the control amount to increase a shutting degree of the hydraulic motor from the hydraulic pump. Meanwhile, the pressure command signal input to the pressure control valve provided at the outlet side of the hydraulic motor adjusts the set pressure of the pressure control valve so as to generate a braking torque corresponding to the operation amount of the braking operation member. This makes it possible to easily brake the slewing structure without a negative operation of returning the slewing operation member to the blocking position (for instance, an neutral position), that is, without an operation whose relation to the braking action cannot be intuitively grasped, but with a positive operation of operating the braking operation member by the operation amount corresponding to the required braking degree.

Preferable as the pressure control valves are, for instance, pilot controlled relief valves connected to motor-side lines reaching to an inlet port and an outlet port of the hydraulic motor respectively, each having a pilot portion into which a relief pilot pressure is input and being adapted to limit an inlet pressure and an outlet pressure of the hydraulic motor to respective set pressures corresponding to the relief pilot pressures. In this case, the motor-side pressure controller preferably includes: a relief pressure control valve connected to a pilot portion of each of the pressure control valves and receiving a relief pressure command signal to adjust the relief pilot pressure to a pressure corresponding to the relief pressure command signal; and a relief pressure command signal input portion which inputs a relief pressure command signal to the relief pressure control valve corresponding to the outlet pressure control valve of the hydraulic motor so as to generate a braking torque corresponding to the operation amount of the braking operation member. The motor-side pressure controller is able to appropriately control the inlet pressure and the outlet pressure of the hydraulic motor, by making a simple action of inputting a relief pressure command signal to the relief pressure control valve to change the relief pilot pressure (relief pressure) of the pilot-type relief valve.

In this case, it is more preferable that the motor-side pressure controller includes a hydraulic path for introducing a discharge pressure (a pump pressure) from the hydraulic pump to a pilot portion of the inlet pressure control valve of the hydraulic motor, to which the relief pressure control valve is provided. This introduction of the pump pressure to the pilot portion of the pressure control valve enables the inlet side pressure to be retained at least at a pump pressure or higher even when the capacity of the relief pressure control valve is relatively small, thereby enabling the inlet pressure required for driving the hydraulic motor to be ensured. Besides, the utilization of the pump pressure can eliminate an requirement of a special hydraulic power source only for ensuring the entrance-side pressure.

Moreover, the invention can be applied to also the case where the hydraulic motor is used so as to be rotated in opposite directions, by giving the motor-side pressure controller: a path selector valve having a first position for opening a hydraulic path for introducing a discharge pressure from the hydraulic pump into a pilot portion of a first pressure control valve which is one of the pressure control valves and communicating a pilot portion of a second pressure control valve which is the other pressure control valve with a tank, and a second position for opening a hydraulic path for introducing a discharge pressure from the hydraulic pump to the pilot portion of the second pressure control valve and communicating the pilot portion of the first pressure control valve with the tank; and a valve position selector which switches the position of the path selector valve according to the slewing direction of the slewing structure.

Specifically, when the hydraulic fluid is supplied from the side of the first pressure control valve to the hydraulic motor, the path selector valve is shifted to the first position, i.e., the inlet side pressure control valve, to retain the relief pressure of the first pressure control not less than the pump pressure while expanding the minimum of the relief pressure of the other pressure control valve, i.e., the outlet side pressure control valve used for the braking control, to the tank pressure. Contrarily, when the hydraulic fluid is supplied from the side of the second pressure control valve to the hydraulic motor, the path selector valve is shifted to the second position to retain the relief pressure of the second pressure control valve, i.e., the inlet side pressure control valve, not less than the pump pressure while expanding the minimum of the relief pressure of the first pressure control valve, i.e., the outlet side pressure control valve, to the tank pressure.

There can be used, as the flow control valve according to the present invention, a general pilot selector valve including a pair of pilot portions into which pilot pressures for flow rate control and being adapted to be opened with a stroke corresponding to the pilot pressure for flow rate control in a direction corresponding to a pilot portion into which the pilot pressure for flow rate control has been input. In this case, the flow control valve actuator preferably includes: a pilot pressure supply portion which is connected to each of the pilot portions through a pilot line and supplies a pilot pressure for flow rate control corresponding to the operation amount of the slewing operation member to the pilot portion corresponding to the operation direction of the slewing operation member; a pilot pressure regulating valve which is provided to each of the pilot lines and receives an input of a pilot pressure command signal to limit the pilot pressure for flow rate control being input to the pilot portion of the flow rate control valve to a pressure corresponding to the pilot pressure command signal; and a pilot pressure command signal input portion which inputs a pilot pressure command signal corresponding to the operation amount of the braking operation member into the pilot pressure regulating valve corresponding to the direction of the operation of the slewing operation member.

The flow control valve actuator can limit the opening of the flow rate control valve with a simple action of inputting a pilot pressure command signal to the pilot pressure regulating valve provided to the pilot line while keeping the relationship between the operation of the slewing operation member and the valve opening action of the flow control valve (pilot selector valve).

The braking control apparatus according to the invention may further comprise a mode selector which is operated to switch a control mode of the braking control apparatus between a slewing operation priority mode and a braking operation priority mode, the slewing operation priority mode giving a priority to the operation of the slewing operation member when the slewing operation member and the braking operation member are simultaneously operated, and the braking operation priority mode giving a priority to the operation of the braking operation member when the slewing operation member and the braking operation member are simultaneously operated, while the valve opening limiter being adapted to reduce the opening of the flow rate control valve corresponding to the operation of the braking operation member to an opening smaller than the opening corresponding to the operation amount of the slewing operation member only when the control mode is switched to the braking operation priority mode.

This mode selector increases the variety of the operation modes which the operator is allowed to select. Specifically, the braking operation priority mode allows the operator to slew the slewing structure by operating the slewing operation member while braking the slewing by operating the braking operation member, as described above. On the other hand, the slewing operation priority mode allows the operator to slew and brake the slewing structure at any time by operating only the slewing operation member, regardless of the operation of the braking operation member.

This application is based on Japanese Patent application serial No. 2009-100507 filed in Japan Patent Office on Apr. 17, 2009, the contents of which are hereby incorporated by reference.

Although the present invention has been fully described by way of example with reference to the accompanying drawings, it is to be grasped that various changes and modifications will be apparent to those skilled in the art. Therefore, unless otherwise such changes and modifications depart from the scope of the present invention hereinafter defined, they should be construed as being included therein.

What is claimed is:

1. A braking control apparatus which is provided to a slewing type working machine including a slewing structure, a hydraulic motor for rotating the slewing structure, and a hydraulic pump for supplying a hydraulic fluid to the hydraulic motor, to control braking of the slewing structure, the braking control apparatus comprising:
a slewing motion detector which detects information about a slewing angular velocity of the slewing structure;
a slewing operation member which is operated to specify a rotation direction and a rotational angular velocity of the hydraulic motor;
a flow control valve which is provided between the hydraulic motor and the hydraulic pump and has a shutting position for shutting off the hydraulic motor from the hydraulic pump while being adapted to be opened from the shutting position to allow the hydraulic fluid to be supplied from the hydraulic pump to the hydraulic motor at a flow rate corresponding to the opening;
a flow control valve actuator which increases the opening of the flow control valve according to an operation amount of the slewing operation member;
pressure control valves each of which receives an input of a pressure command signal from outside, the pressure control valves provided at an inlet side and an outlet side of the hydraulic motor respectively to limit respective maximums of an inlet pressure and an outlet pressure to respective set values corresponding to the respective pressure command signals;
a braking operation member which is provided separately from the slewing operation member and is operated to brake a slewing motion of the slewing structure;
a motor-side pressure controller which inputs a pressure command signal to each pressure control valve so as to maintain the set pressure of the pressure control valve at the inlet side of the hydraulic motor to a pressure which enables the hydraulic motor to be driven and let the set pressure of the pressure control valve at the outlet side of the hydraulic motor be a set pressure to generate a braking torque corresponding to the operation amount of the braking operation member; and
a valve opening limiter which reduces, in accordance with the operation of the braking operation member, the opening of the flow control valve to an opening smaller than the opening corresponding to the operation amount of the slewing operation member.

2. The braking control apparatus of a slewing type working machine according to claim 1, wherein
each of the pressure control valves is a hydraulic pilot controlled relief valve having a pilot portion into which a relief pilot pressure for relief is input, the pressure control valves being connected to motor-side lines which reach an inlet port and an outlet port of the hydraulic motor respectively and adapted to limit the inlet pressure and the outlet pressure of the hydraulic motor to respective set pressures corresponding to the relief pilot pressures, and
the motor-side pressure controller includes: a relief pressure control valve connected to a pilot port of each of the pressure control valves and receiving a relief pressure command signal to adjust the relief pilot pressure to a pressure corresponding to the relief pressure command signal; and a relief pressure command signal input portion which inputs a relief pressure command signal to the relief pressure control valve corresponding to the pressure control valve at the outlet side of the hydraulic motor so as to generate a braking torque corresponding to a operation amount of the braking operation member.

3. The braking control apparatus of a slewing type working machine according to claim 2, wherein the motor-side pressure controller includes a hydraulic path for introducing a discharge pressure from the hydraulic pump to a pilot portion of the pressure control valve at the inlet side of the hydraulic motor, and the relief pressure control valve is provided to the hydraulic path.

4. The braking control apparatus of a slewing type working machine according to claim 3, wherein
the motor-side pressure controller includes: a path selector valve having a first position for opening a first hydraulic path for introducing a discharge pressure from the hydraulic pump to a pilot portion of a first pressure control valve which is one of the pressure control valves and communicating a pilot portion of a second pressure control valve which is the other pressure control valve with a tank, and a second position for opening a second hydraulic path for introducing a discharge pressure from the hydraulic pump to the pilot portion of the second pressure control valve and communicating the pilot portion of the first pressure control valve with the tank; and the valve position selector which switches the position of the path selector valve according to a slewing direction of the slewing structure.

5. The braking control apparatus of a slewing type working machine according to claim 1, wherein
the flow control valve is a pilot controlled selector valve including a pair of pilot portions into which a pilot pressure for flow rate control is input and being adapted to be opened by a stroke corresponding to the pilot pressure for flow rate control in a direction corresponding to the pilot portion into which the pilot pressure for flow rate control has been input, and the flow control valve actuator includes: a pilot pressure supply portion connected to each of the pilot portions through a pilot line to supply the pilot pressure for flow rate control corresponding to the operation amount of the slewing operation member to the pilot portion corresponding to the direction of the operation of the slewing operation member; a pilot pressure regulating valve provided to each of the pilot lines and receiving an input of a pilot pressure command signal to limit the pilot pressure for flow rate control to be input into the pilot portion of the flow control valve to a pressure corresponding to the pilot pressure command signal; and a pilot pressure command signal input portion which inputs the pilot pressure command signal corresponding to the operation amount of the braking operation member to the pilot pressure regulating valve corresponding to the operation direction of the slewing operation member.

6. The braking control apparatus of a slewing type working machine according to claim 1, further comprising a mode selector which is operated to switch a control mode of the braking control apparatus between a slewing operation priority mode giving a priority to the slewing operation of the slewing operation member when the slewing operation member and the braking operation member are simultaneously operated, and a braking operation priority mode giving a priority to the braking operation of the braking operation member when the slewing operation member and the braking operation member are simultaneously operated, and wherein
the valve opening limiter reduces the opening of the flow control valve corresponding to the operation of the braking operation member to an opening smaller than the opening corresponding to the operation amount of the slewing operation member only when the control mode is switched to the braking operation priority mode.

* * * * *